(12) United States Patent
Yu et al.

(10) Patent No.: US 8,932,738 B2
(45) Date of Patent: Jan. 13, 2015

(54) FUEL CELL ASSEMBLY STRUCTURE

(75) Inventors: Dung-Di Yu, Taoyuan County (TW);
Yung-Neng Cheng, Taoyuan County
(TW); Ruey-Yi Lee, Taoyuan County
(TW); Chien-Hsiung Lee, Taoyuan
County (TW)

(73) Assignee: Institute of Nuclear Energy Research,
Longtan, Taoyuan (TW)

( * ) Notice: Subject to any disclaimer, the term of this patent is extended or adjusted under 35 U.S.C. 154(b) by 1236 days.

(21) Appl. No.: 12/253,224

(22) Filed: Oct. 16, 2008

(65) Prior Publication Data

US 2010/0099007 A1 Apr. 22, 2010

(51) Int. Cl.
*H01M 2/08* (2006.01)
*H01M 2/18* (2006.01)

(52) U.S. Cl.
USPC ............ 429/35; 429/414; 429/452; 429/458; 429/507; 429/508; 429/514

(58) Field of Classification Search
USPC ................. 429/456, 463, 466, 467, 470, 471
IPC ............ H01M 8/004,8/04, 8/24, 8/245, 8/2475, H01M 8/2485, 8/249; Y02E 60/50
See application file for complete search history.

(56) References Cited

U.S. PATENT DOCUMENTS

| | | | | |
|---|---|---|---|---|
| 6,030,718 A | * | 2/2000 | Fuglevand et al. | 429/410 |
| 6,582,842 B1 | * | 6/2003 | King | 429/423 |
| 2006/0110647 A1 | * | 5/2006 | Sherman et al. | 429/38 |

* cited by examiner

*Primary Examiner* — Alix Echelmeyer

(57) ABSTRACT

A fuel cell assembly structure mainly comprises a housing in which there is an accommodating space; a plurality of unit cell stacks that are stacked in the same direction in the accommodating space of the housing and made by stacking in sequence a cathode layer, a power generation electrode, an anode layer and a connection disk; a connection disk connecting is series each unit cell stack, a sealing disk and a cover in sequence to cover the opening of the accommodating space of the housing. On the outer side of the cover there is a connection base, at least one surface of which has a plurality of conduits and the other end connects to a plurality of cell stack bypass manifolds that further connect to a plurality of side bypass manifolds.

7 Claims, 5 Drawing Sheets

FUEL CELL ASSEMBLY STRUCTURE

BACKGROUND OF THE INVENTION

1. Field of the Invention

The invention relates to a fuel cell assembly structure, which especially refers to a simple structure that can be easily produced and dissembled with reduced production cost and increased product competitiveness.

2. Description of the Prior Art

Fuel cell is a device that uses fuel (hydrogen, oxygen as most common) to conduct chemical reaction and directly converts chemical energy into electrical energy. Since it has high conversion efficiency, wide range of fuel selection, no hazard in reaction process and useable by-product (water), it is generally considered as an alternative energy to fossil fuel.

In the principle of solid oxide fuel cell, the oxygen atom at cathode receives electrons by means of catalytic effect to turn into oxygen ion in reduction reaction. The oxygen ion is transported through electrolyte to anode and reacts with the fuel to produce water. At anode, oxidation reaction occurs and electrons are released and transported through an external loop back to cathode. At the same time, energy is supplied to the load. The only product (emission) from fuel cell is water. The above "hydrogen" fuel can come from any hydrocarbon, such as natural gas, methane, electrolysis of water, biogas . . . etc. Since the technology utilizes the chemical reaction between hydrogen and oxygen to generate electric current and water. There is absolutely no pollution and no issue of lengthy charging time with traditional battery. In a commercial fuel cell structure, key components like anode, cathode and electrolyte between the two electrodes form a membrane electrode assembly after a spray coating process and a flow field plate is added to their outer side. Thus, a single cell module is assembled. But because a single cell module produces a very limited amount of electrical energy (voltage, current). In a practical application, it needs serial connection of cells (or cell module) to increase output voltage and parallel connection to increase output current to achieve outputs in a practical level. In a commonly seen structure of fuel cell, one uses glass ceramic materials on the connection plate and the framework to form a specific flow field space and maintain airtightness. However, such a structure is fragile, rarely useful, and hard to repair interiors and lower maintenance cost. The other is to put a plurality of previously mentioned cell modules in the housing and a conductive connection plate between the cell modules, which are then connected serially. Since each cell module needs introduction of hydrogen and oxygen from outside to pass anode and cathode, flow channels are needed in the housing as passages for hydrogen and oxygen. One common method is to distribute a plurality of protruding holes around anode and cathode and allow different holes to connect to the anode and the cathode. When a plurality of cell modules is stacked, all the holes are connected to each other and from a flow channel to supply hydrogen and oxygen. However, such structure (a plurality of holes around anode and cathode) lacks design for restriction and positioning at edge, so the accommodating space inside the housing lacks the shape that fits. As a result, since the connection and positioning between cell modules is not easy, it increases the difficulty in assembly. Besides, the single module product that lacks integration is hard to disassemble and replace components and therefore the cost for maintenance, repair and usage too high to be competitive and to offer economic benefits.

In view of the above drawbacks with traditional fuel cell, the inventor has sought improvement over the above drawbacks and come up with this invention.

SUMMARY OF THE INVENTION

The main objective for the invention is to provide an assembly structure for fuel cell with simple structure and geometrical shape for components. It is not only easy for assembly but also very competitive because its production cost is reduced.

Another objective for the invention is to provide an assembly structure for fuel cell with modulized structure, so it allows easy replacement of the only damaged component to lower usage cost and it also enables capacity expansion to increase application range.

Another objective for the invention is to provide an assembly structure for fuel cell that is easy to take apart and provides convenience during repair.

To achieve the above objectives and function, the technical approaches adopted by the invention include: a housing, an accommodating space with concaves on its surface; at least two pairs of symmetric convex ribs that are located along the inner periphery of the accommodating space and extend out towards the opening; a plurality of concaves formed naturally between convex ribs; and a plurality of unit cell stacks that are arranged toward the same direction in the accommodating space of the housing. The unit cell stack is made by stacking in sequence a cathode layer, a power generation electrode, an anode layer and a connection disk. The cathode layer is a press-sealing ring that is put along the peripheral rim of the cathode grid. On the outer periphery of the press-sealing ring there are at least two symmetric first convex sections, which fit the two concaves in the housing. In the first convex section there is a first through-hole that connects to the cathode grid. The anode layer is a press-sealing ring that is put along the peripheral rim of the anode grid. At the location different than the first convex section on the press-sealing ring, there are at least two second convex sections, which fit the other two concaves in the housing. In each of the second convex sections, there is a second through-hole that connects to the anode grid. When a plurality of unit cells is stacked, each first and second through-holes are connected. The connection disk is to connect each unit cell stack. A sealing disk is to cover the opening of the accommodating space for the housing. On the sealing disk there is a plurality of cathode through-holes that fit the first and second through-holes of the cathode layer. Further, there is a plurality of anode through-holes that fit the first and second through-holes of the anode layer.

According to the above structure, on outer side of the sealing disk there is a cover, around which there is a plurality of through-holes. The housing has a plurality of bolts around the opening of the accommodating space that can fit each of the through-holes and allow each bolt to pass the through-hole and get sleeved with an elastic component, and get mated with a nut for fixation.

According to the above structure, on the outer side of the cover there is a connection base, on at least one side of which there is a plurality of conduits. One end of the conduit connects to each through-hole for cathode and anode. The other end connects to the cell stack bypass manifold, through which the structure connects to the unit cell stack of the housing.

According to the above structure, the plurality of cell stack bypass manifolds connect to a plurality of side bypass manifolds. To make the above objectives, function and features for the invention further understandable, the following description is provided with figures.

DETAILED DESCRIPTION OF THE PREFERRED EMBODIMENT

Figure 1:
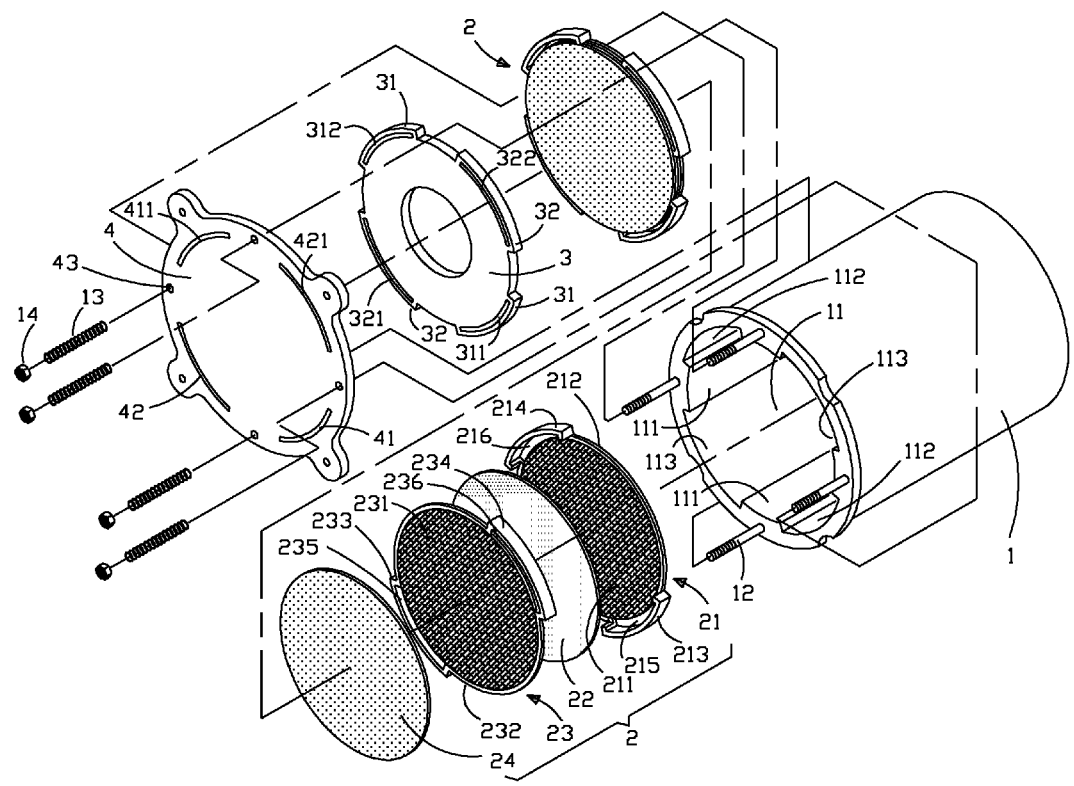
FIG. 1 is the structural disassembly diagram for the components for the unit cell stack and the housing.
Figure 2:
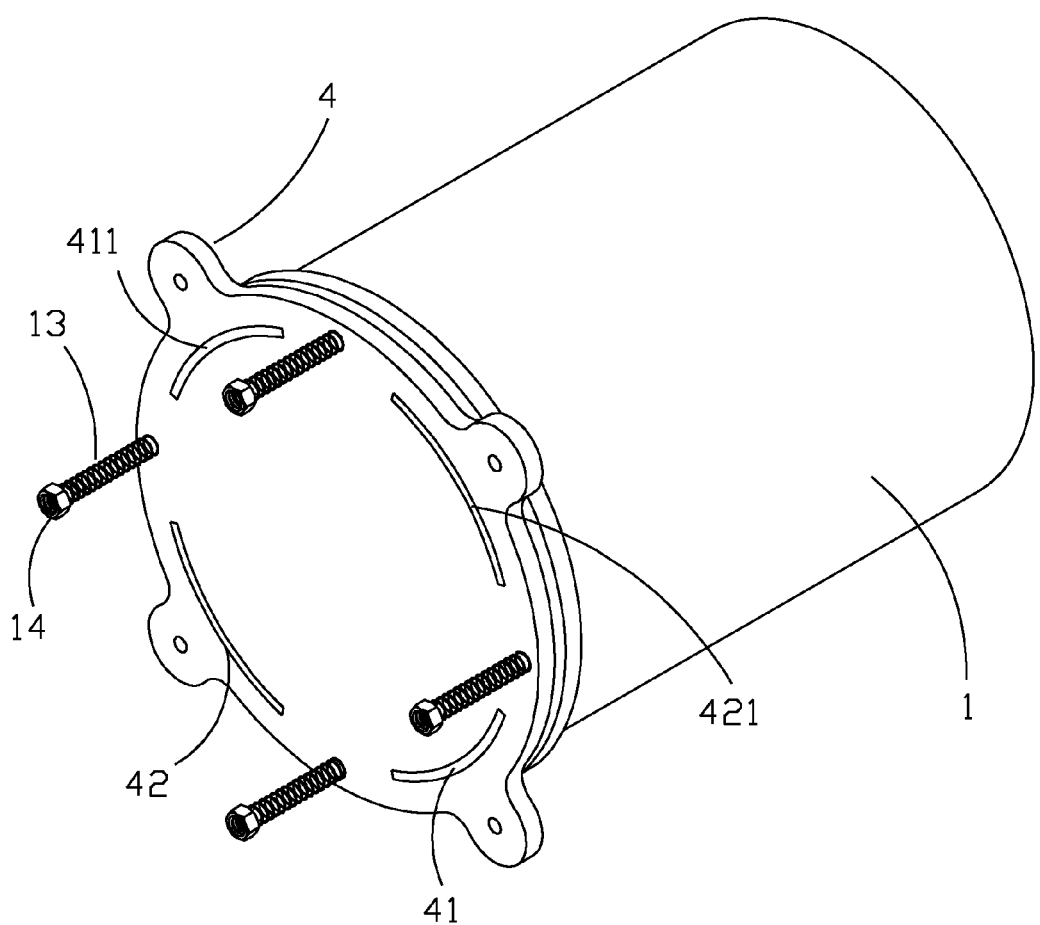
FIG. 2 is the assembly diagram for the unit cell stack and the housing for the invention.
Figure 3:
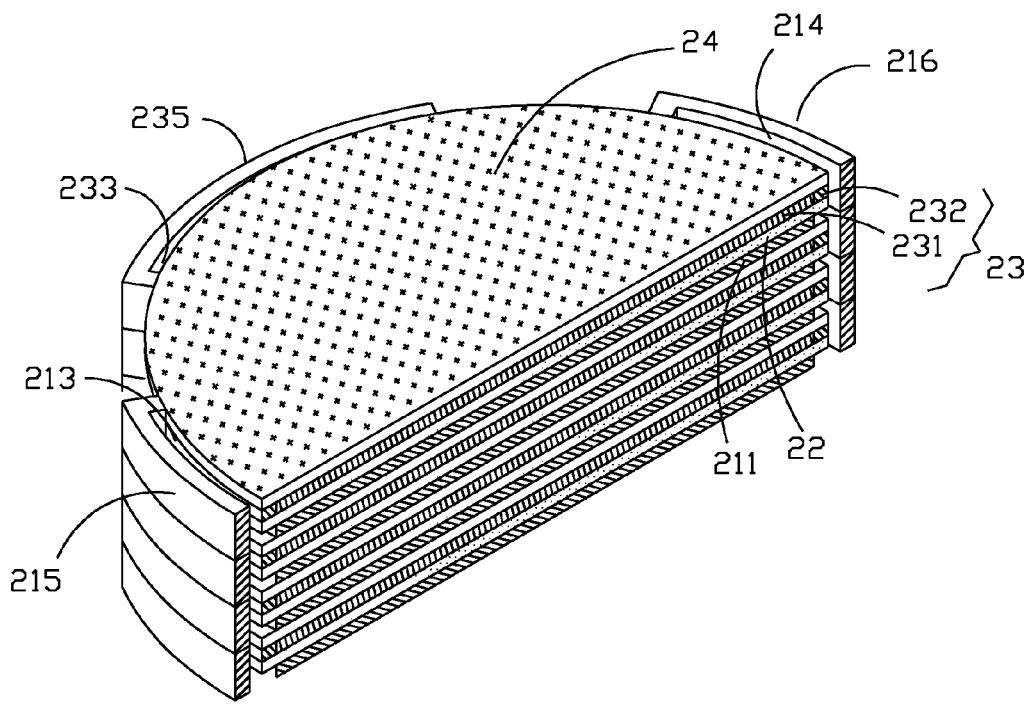
FIG. 3 is the cross-section structural diagram for a flow channel of the unit cell stack for the invention.
Figure 4:
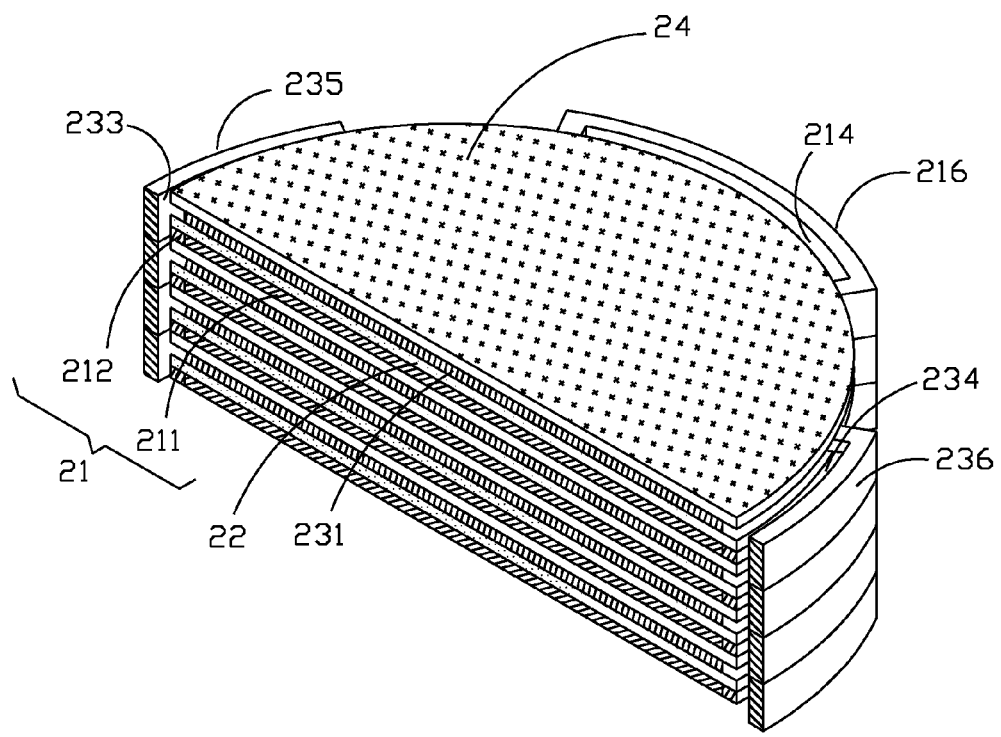
FIG. 4 is the cross-section structural diagram for another flow channel of the unit cell stack for the invention.
Figure 5:
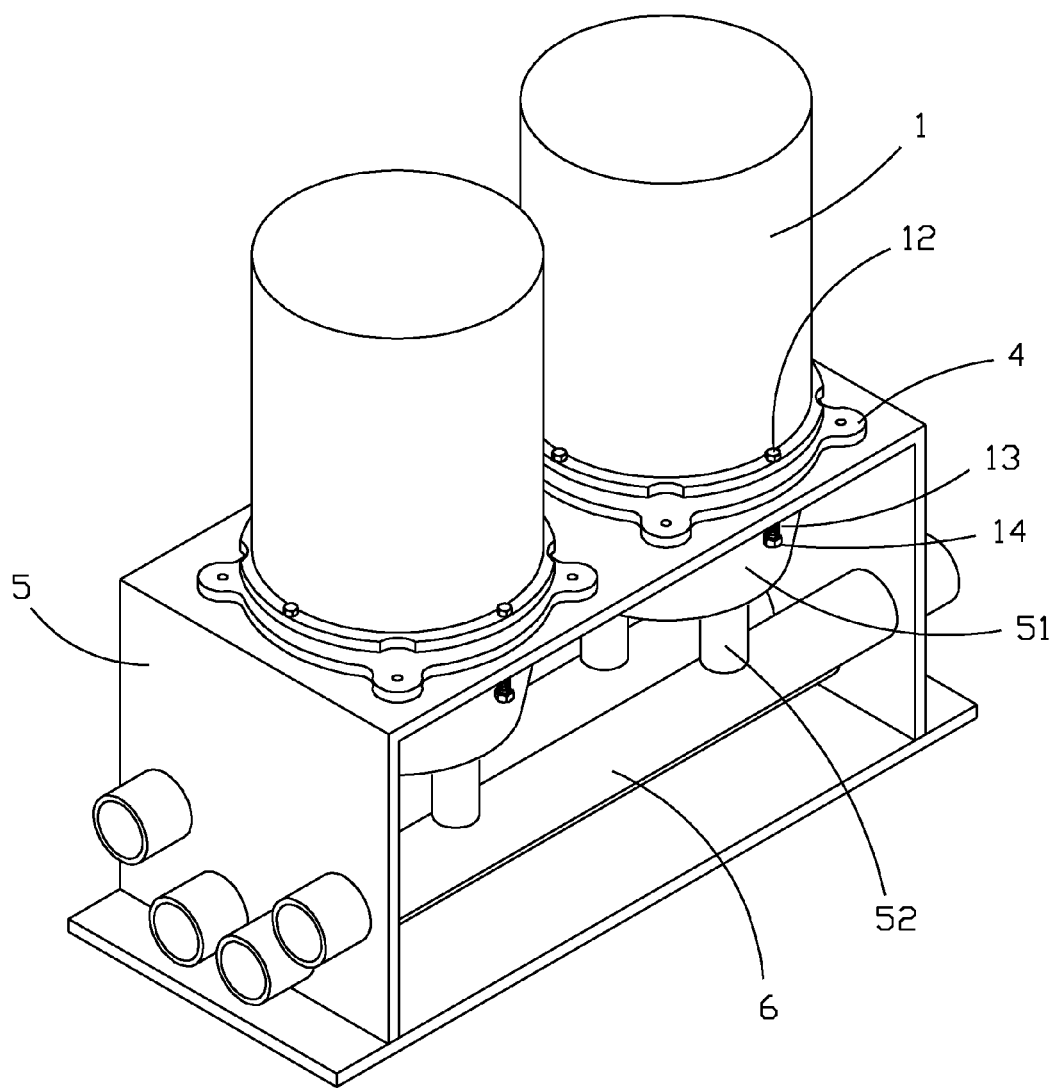
FIG. 5 is the illustration for one application for the invention.
Figure 6:
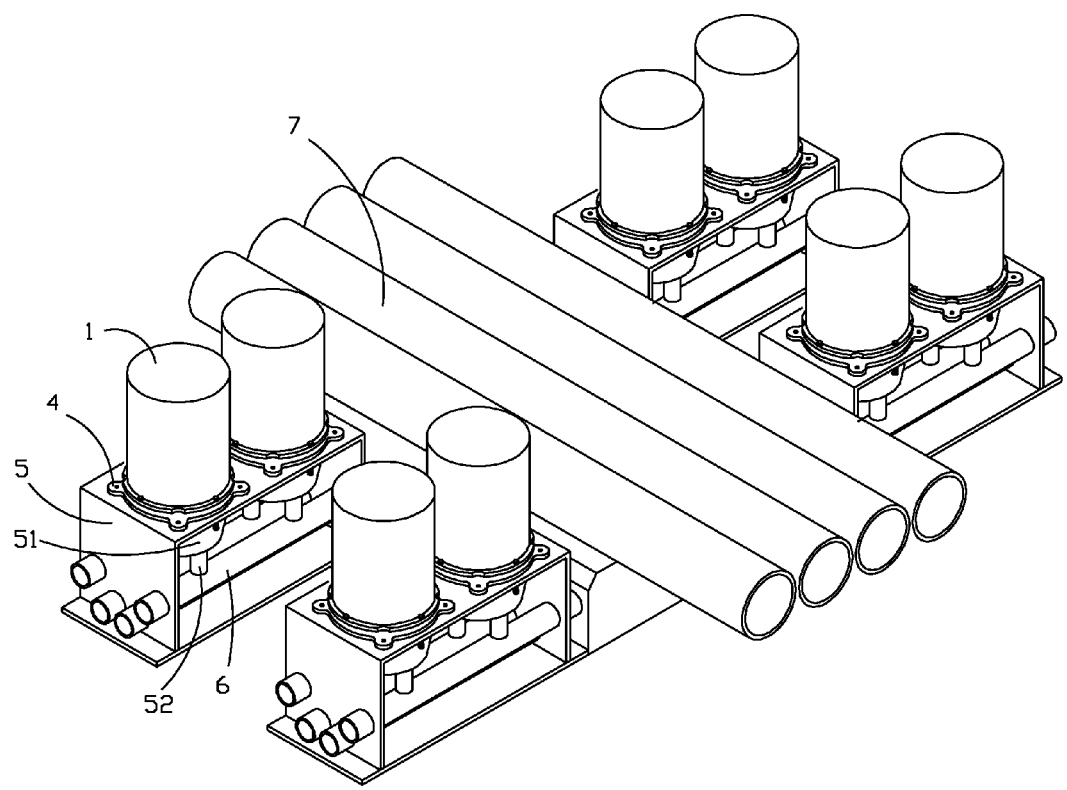
FIG. 6 is the illustration for another application for the invention.

Please refer to the figures. It can be clearly found that the invention mainly comprises a housing 1, unit cell stack 2, sealing disk 3 and cover 4 etc. In the housing 1 there is a surface coating of insulation (ceramic) material for the accommodating space 11. On the inner periphery of the accommodating space 11 there are at least two sets (at least four lines) of symmetric and extending convex ribs 111 along the central axis, so between the convex ribs 111 there form two sets of symmetric concaves 112, 113. Besides, around the opening of the accommodating space 11, there is a plurality of bolts 12. A unit cell stack 2 is made by stacking a cathode layer 21, a power generation electrode 22, an anode layer 23 and a connection disk 24 in sequence. The cathode layer 21 is a cathode grid 211 (antioxidative metals or ceramic oxides) that has a press-sealing ring 212 around its periphery. Around the outer periphery of the press-sealing ring 212 there are two sets of symmetric first convex sections 215, 216 that can fit the two concaves 112 in the housing 1. Further the first convex sections 215, 216 extend toward one side of the anode layer 23. In each of the first convex sections 215, 216, there are first through-holes 213, 214 that connect to the cathode grid 211. The anode layer 23 is an anode grid 231 (nickel) that has a press-sealing ring 232 around its periphery. Around the outer periphery of the press-sealing ring 232 (different from the position of first convex sections 215, 216), there are at least two symmetric and extending second convex sections 235, 236 toward one side of the cathode layer 21. The two second convex sections 235, 236 can fit the two concaves 113 in the housing respectively. In the second convex sections 235, 236 there are second through-holes 233, 234 that connect the anode grid 231. Thus, the power generation electrode 22 between the cathode and the anode layers 21, 23 are subject to the blocking by the protruding first convex sections 215, 216 and the second convex sections 235, 236 and get positioned. Besides, the connection disk 24 is also subject to the restriction by the first convex sections 215, 216 for positioning on the other side of the anode layer 23. Thus, a plurality of unit cell stacks 2 stick into the two concaves 112 of the housing 1 with the first convex sections 215, 216 of the cathode layer 21. On the other hand, the second convex sections 235, 236 of the anode layer 23 stick into the two concaves 113. They become stacked in sequence to make first through-holes 213, 214 connect to each other and the second through-hole 233, 234 connect to each other too. The unit cell stacks 2 through the connection disk 24 become connected in series. Around the periphery of the sealing disk 3 there is a plurality of convex sections 31, 32 that fit the concaves 112, 113 of the housing 1 and are inserted into the opening of the accommodating space 11 of the housing 1 to form tight sealing. In each convex section 31 there is a plurality of cathode through-holes 311, 312 that fit the first and second through-holes 213, 214 for the cathode layer 21. In the convex section 32 there is a plurality of anode through-holes 321, 322 that fit the first and second through-holes 233, 234 for the anode layer 23. Around the cover 4, there is a plurality of through-holes 43 that can be fit with each bolt 12 on the housing 1 and allow each bolt 12 to get sleeved with an elastic component 13 (spiral spring) and screwed by a nut 14, and finally get fixation on the outer side of the sealing disk 3. Between through-holes 43 of the cover 4 there is a plurality of cathode through-holes 41, 411 that can fit the first and second through-holes 213, 214 for the cathode layer 21. There is a plurality of anode through-holes 42, 421 that can fit the first and second through-holes 233, 234 for the anode layer 23.

In the above structure, oxygen (or air) can enter through the cathode through-hole 41 (or 411) on the cover 4. After it passes the cathode through-hole 311 (or 312) of the sealing disk 3 and the first through-hole 213 (or 214) of the unit cell stack 2, it makes full contact with the cathode grid 211. Then, it leaves from the first through-hole 214 (or 213) on the other side, the cathode through-hole 312 (or 311) of the sealing disk 3 and the cathode through-hole 411 (or 41) of the cover 4. This constitutes a circulation cycle of oxygen (or air) flow. Hydrogen (or other fuel gases) can enter from the anode through-hole 42 (or 421) of cover 4. After it passes the anode through-hole 321 (or 322) of the sealing disk 3 and the second through-hole 233 (or 234) of the unit cell stack 2, it makes full contact with the anode grid 231. Then, it leaves from the second through-hole 234 (or 233) from the other side and the anode through-hole 322 (or 321) of the sealing disk 3 and the anode through-hole 421 (or 42) of the cover 4. This constitutes a circulation cycle of hydrogen (or fuel gases). The cover 4 pushed by an elastic component 13 (spiral spring) can maintain compressive elasticity to absorb the deformation from shrinkage due to cooling or expansion due to heating.

In a practical application, the outer side of the cover 4 can connect to a connection base 51. With the connection base 51 and the cover 4, a plurality of housings 1 can be tied and fixed to a support framework 5. On one surface of the connection base 51 there is connection to each cathode through-hole 41 of the covers 4, 411 and anode through-holes 42, 421. Each through-hole is led through a plurality of conduits 52 to a plurality of cell stack bypass manifolds 6. Then it goes through a plurality of cell stack bypass manifolds 6 to a plurality of side bypass manifolds 7. This makes up an application example for fuel cell.

In summary, the assembly structure for the fuel cell can achieve structural simplicity, easy production, reduced production cost and improved product competitiveness. It is really an innovative and progressive invention. Thus, a patent application is filed. However, the above description is only for a preferred embodiment for the invention. Those changes, modification, alteration or equivalent replacement shall all fall into the range of claims by the invention.

What is claimed is:

1. A fuel cell assembly structure consisting of:
   a housing having an accommodating space with concaves on its surface, at least two pairs of symmetric convex ribs furnished along the inner periphery of the accommodating space extend out towards opening, wherein a plurality of concaves formed between convex ribs, and a plurality of unit cell stacks that are arranged toward the same direction in the accommodating space of the housing;

a unit cell stack is made by stacking in sequence a cathode layer, a power generation electrolyte, an anode layer and a connection disk,
  wherein the cathode layer is furnished with a press-sealing ring along a peripheral rim of a grid surface of the cathode layer;
  wherein the anode layer is furnished with a press-sealing ring along a peripheral rim of a grid surface of the anode layer;
at least two symmetric first convex sections on the outer periphery of the press-sealing ring of the anode layer extending toward one side of the cathode layer, fitting into the two concaves in the housing, and forming a first through-hole that connects to the grid surface of the cathode layer;
at least two second convex sections at the location different than the first convex section on the outer periphery of the press-sealing ring of the cathode layer extending toward one side of the anode layer, fitting into the other two concaves in the housing, forming a second through-hole that connects to the grid surface of the anode layer;
wherein each first and second through-holes are connected, respectively, when a plurality of unit cells is stacked, and a connection disk is provided to connect each unit cell stack; and
a sealing disk is to cover the opening of the accommodating space for the housing, on the sealing disk there is a plurality of cathode through-holes that fit the first and second through-holes of the cathode layer, further, there is a plurality of anode through-holes that fit the first and second through-holes of the anode layer,
wherein on outer side of the sealing disk there is a cover, around which there is a plurality of through-holes, the housing has a plurality of bolts around the opening of the accommodating space that can fit each of the through-holes on the cover and allow each bolt to pass the through-hole and get sleeved with an elastic component, and get mated with a nut for fixation.

2. As described in claim 1 for a fuel cell assembly structure, on the cover there is a plurality of cathode through-holes that fit the first and the second through-holes of the cathode layer, further, there are a plurality of anode through-holes that fit the first and the second through-holes of the anode layer.

3. As described in claim 2 for a fuel cell assembly structure, the outer side of the cover, there is a connection base, on at least one side of which there is a plurality of conduits, one end of the conduit connects to each through-hole for cathode and anode, the other end connects to the cell stack bypass manifold, through which the structure connects to the unit cell stack of the housing.

4. As described in claim 3 for a fuel cell assembly structure, the housing is held to a support framework by a connection base.

5. As described in claim 4 for a fuel cell assembly structure, the plurality of cell stack bypass manifolds can connect to a plurality of side bypass manifolds.

6. As described in claim 3 for a fuel cell assembly structure, the plurality of cell stack bypass manifolds can connect to a plurality of side bypass manifold.

7. As described in claim 1 for a fuel cell assembly structure, around the sealing disk there is a plurality of convex sections that fit each concave in the accommodating space of the housing.

* * * * *